(12) United States Patent
Blanchard

(10) Patent No.: US 9,824,235 B2
(45) Date of Patent: Nov. 21, 2017

(54) WEB SESSION SECURITY TECHNIQUES

(71) Applicant: NCR Corporation, Duluth, GA (US)

(72) Inventor: Mikel Vincent Blanchard, Orange, CA (US)

(73) Assignee: NCR Corporation, Duluth, GA (US)

(*) Notice: Subject to any disclaimer, the term of this patent is extended or adjusted under 35 U.S.C. 154(b) by 0 days.

(21) Appl. No.: 15/450,819

(22) Filed: Mar. 6, 2017

(65) Prior Publication Data

US 2017/0177903 A1 Jun. 22, 2017

Related U.S. Application Data

(63) Continuation of application No. 14/744,594, filed on Jun. 19, 2015, now Pat. No. 9,672,376.

(51) Int. Cl.
| G06F 21/62 | (2013.01) |
| G06F 21/31 | (2013.01) |
| G06F 3/0481 | (2013.01) |
| G06F 21/84 | (2013.01) |
| G06T 5/00 | (2006.01) |

(52) U.S. Cl.
CPC .......... G06F 21/6245 (2013.01); G06F 21/84 (2013.01); G06T 5/002 (2013.01); G06F 21/31 (2013.01)

(58) Field of Classification Search
CPC ..... G06K 9/2054; H04L 12/585; H04L 51/12; H04L 63/20; G06F 3/0481; G06F 21/31; G06F 21/62; G06F 21/6218; G06F 21/6245; G06F 2221/2137
USPC .................... 726/1–5, 16, 17, 21, 22, 26–28
See application file for complete search history.

(56) References Cited

U.S. PATENT DOCUMENTS

2009/0019379 A1* 1/2009 Pendergast ........ G06F 17/30011
  715/762
2009/0135444 A1* 5/2009 Best .................... G06F 21/6245
  358/1.15

* cited by examiner

*Primary Examiner* — Beemnet Dada
*Assistant Examiner* — Kalish Bell
(74) *Attorney, Agent, or Firm* — Schwegman, Lundberg & Woessner

(57) ABSTRACT

Web session security techniques which protect displayed sensitive information. In one example embodiment, the method includes setting, by a processor, a timer following a last user action during use of a web application; determining, by the processor, that a threshold time period since the last user action exceeds a predetermined time period; and making, by the processor, displayed sensitive information unreadable.

13 Claims, 4 Drawing Sheets

WEB SESSION SECURITY TECHNIQUES

BACKGROUND

The present invention relates to methods of securing information entered and displayed in World Wide Web ("web") pages, and more specifically to web session security techniques.

Web applications that display or accept entry of sensitive information typically employ timeout mechanisms to secure user entered data following a period of user inactivity. For example, if the user walks away, gets distracted, or stops entering data for any other reason, the timeout mechanism logs the user out.

Unfortunately, use of such a timeout mechanism results in deletion of any data that the user has typed. The resulting data loss can be significant.

Therefore, it would be desirable to provide an improved mechanism for securing user data entered during a web session that overcomes this problem.

SUMMARY

In accordance with the teachings of the present invention, web session security techniques are provided.

In one example embodiment, the method includes setting, by a processor, a timer following a last user action during use of a web application; determining, by the processor, that a threshold time period since the last user action exceeds a predetermined time period; and making, by the processor, displayed sensitive information unreadable.

In one example embodiment, making the displaying sensitive information unreadable includes blurring the displayed sensitive information.

In one example embodiment, the method includes setting, by a processor, a timer following a last user action during use of a web application; determining, by the processor, that a threshold time period since the last user action exceeds a predetermined time period; capturing, by the processor, a first image of the contents of a window associated with the web application; blurring the first image to create a second image in which the sensitive information unreadable; obtaining screen coordinates associated with the contents of the window; and displaying the second image at the screen coordinates over the contents of the window.

In one example embodiment, the method includes displaying, by a processor, a form in a web browser window designed to record sensitive user information; setting, by a processor, a timer following a last user action while filling in the form; determining, by the processor, that a threshold time period since the last user action exceeds a predetermined time period; and making, by the processor, the displayed sensitive information unreadable but the form recognizable by a user.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
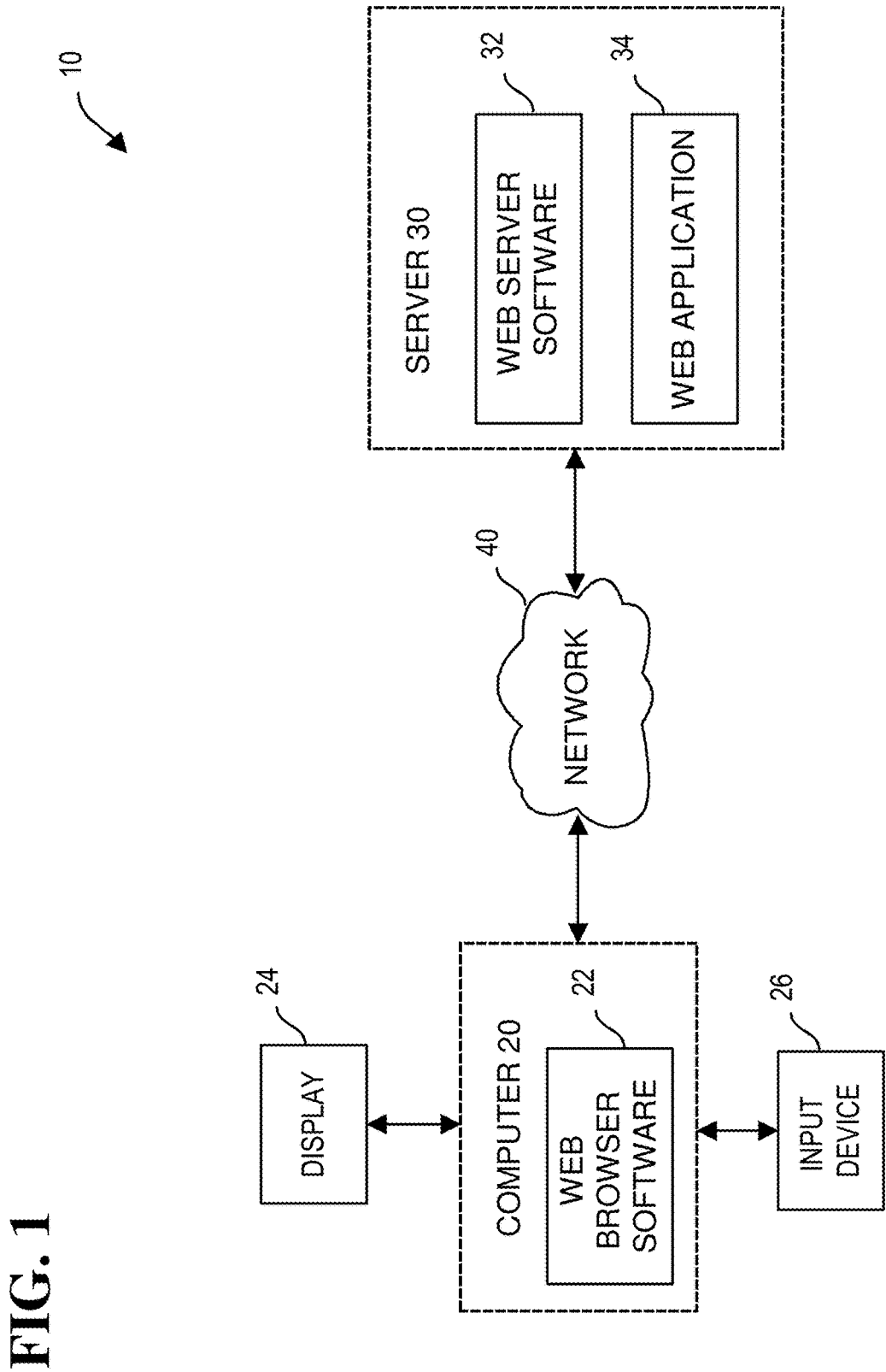
FIG. 1 is a block diagram of an example system for executing a web application.

With reference to FIG. 1, an example system 10 includes computer 20 and server 30 connected via network 40.

Computer 20 may include one or more processors, memory, and program and data storage. Computer 20 may execute an operating system such as a Microsoft, Linux, Google, or Apple operating system.

In one example embodiment, computer 20 may be a personal computer, laptop computer, tablet computer, smart phone, or other computing device associated with private use or a particular user.

In another example embodiment, computer 20 may include a kiosk, automated teller machine, or other computing device associated with public use.

Display 24 and input device 26 facilitate user interaction with computer 20. Input device may include a keyboard and/or mouse. Display 24 and input device 26 may be combined as a touch screen.

Computer 20 may execute software which is stored in a computer readable medium, such as a memory. For example, computer 20 may execute web browser software 22, which opens web pages and other content associated with web pages. Web browser software 22 may include add-on or plugin software that enhances functionality of web browser software 22.

Server 30 may include one or more processors, memory, and program and data storage. Server 30 may execute an operating system such as a Microsoft, Linux, Google, or Apple operating system.

In one example embodiment, server 30 is located at a transaction establishment, such as a bank branch office or retail store.

In another example embodiment, server 30 is located remotely, "in the cloud", such as a server associated with an on-line bank or retail web site.

Server 30 may execute software which is stored in a computer readable medium, such as a memory. For example, server 30 may execute web server software 32, which facilitates configuration and operation of server 30 as a web server for hosting web pages and other web content. In the illustrated example embodiment, web server software 32 hosts web application 34.

Web application 34 captures information entered by a user and displays information associated with the user as part of a user session at the web site, or web session. The information may include sensitive information that the user wishes to be kept in confidence or kept private, or that the user otherwise wishes not to be publicly disclosed or disclosed to unauthorized persons. The sensitive information may be alone or accompanied by other information that is not necessarily sensitive, though the user might also want to be kept private.

Information may be sensitive because it is associated with a person or is otherwise commonly recognized as sensitive. For example, sensitive information may include, but not be limited to, a person's social security number, credit card number, bank account number, income, political affiliation, and marital status.

Web application 34 may be used by the owner of the sensitive information or someone who knows and uses the sensitive information on behalf of the owner, either with express permission from the owner and/or with a recognized legal duty to protect the sensitive information. For example, the owner of sensitive information may use web application 34 to complete a credit card application containing the sensitive information. As another example, the owner of the sensitive information may authorize the owner's bank to know and use the owner's sensitive information in connection with a loan application form by the user.

In order to limit possible communication of sensitive information that is currently being displayed by display 24 during a web session, web application 34 monitors interaction with computer 20 and determines whether a period of user inactivity exceeds a predetermined threshold time period. Web application 34 may determine user inactivity by monitoring input device 26. For example, web application 34 may monitor keystroke and/or mouse click messages, or touch messages and determine when no such messages have been received for at least the predetermined threshold time period.

Following the predetermined threshold time period of user inactivity, web application 34 makes currently displayed sensitive information unreadable.

In one example embodiment, web application 34 makes all displayed information unreadable.

Web application 34 captures an image of the contents of the window associated with web application 34 (e.g., a window of web browser software 22) and displays an altered image whose contents are unreadable in the window where the contents where displayed.

Web application 34 captures an image of the contents of the window associated with web application 34 (e.g., a window of web browser software 22) and calls another program to apply an algorithm to the image (that alters the image and make its contents unreadable) and to display an altered image in the window where the contents where displayed.

The change from readable content to unreadable content appears in real time.

The algorithm may be chosen such that the altered image has similarities with the unaltered image so that a user can recognize what the user was working on, even though the user cannot read any of the sensitive information.

One example algorithm is a blurring algorithm, such as a Gaussian blurring algorithm. Other algorithms are also envisioned.

In another example embodiment, web application 34 includes and applies an algorithm to the image to alter the image and make its contents unreadable.

In yet example embodiment, web application 34 includes a web browser control that alters the image and makes the contents unreadable.

In yet another example embodiment, web application 34 includes one or more a cascading style sheet (CSS) functions to alter the contents of the window to make them unreadable.

In one example embodiment, web application 34 uses Microsoft Silverlight brand browser plugin software to capture the image of the contents of the window associated with web application 34, alter the image, and display the altered image over the window contents. Web application 34 may use a blurring function available in the Silverlight plugin to create the altered image from the original image. Web application 34 may also use the Silverlight plugin to obtain screen coordinates associated with the window contents and accurately display the altered image at the same coordinates.

In addition to making currently displayed information unreadable, web application 34 may provide additional security by unloading the sensitive information (or all of the displayed information) from memory and storing such information in storage. Web application 34 restores such information to memory when the user resumes use of web application 34.

Web application 34 continues to monitor for user activity after making the currently displayed information unreadable. When web application 34 determines user activity, web application 34 displays a login box. A user must enter login credentials in order to resume use. In one example embodiment, login credentials include a user name and password. In another example embodiment, login credentials include just a password.

After the user enters login credentials, web application 34 makes the currently displayed information readable again.

In one example embodiment, web application 34 runs within web browser software 22 and may include a web page combined with script instructions and a CSS.

In another example embodiment, web application 34 is a client program that interacts with web server software 32.

In yet another example embodiment, web application 34 is a mobile application intended for execution on a tablet computer, smart phone, or other mobile computing device.

Figure 2:
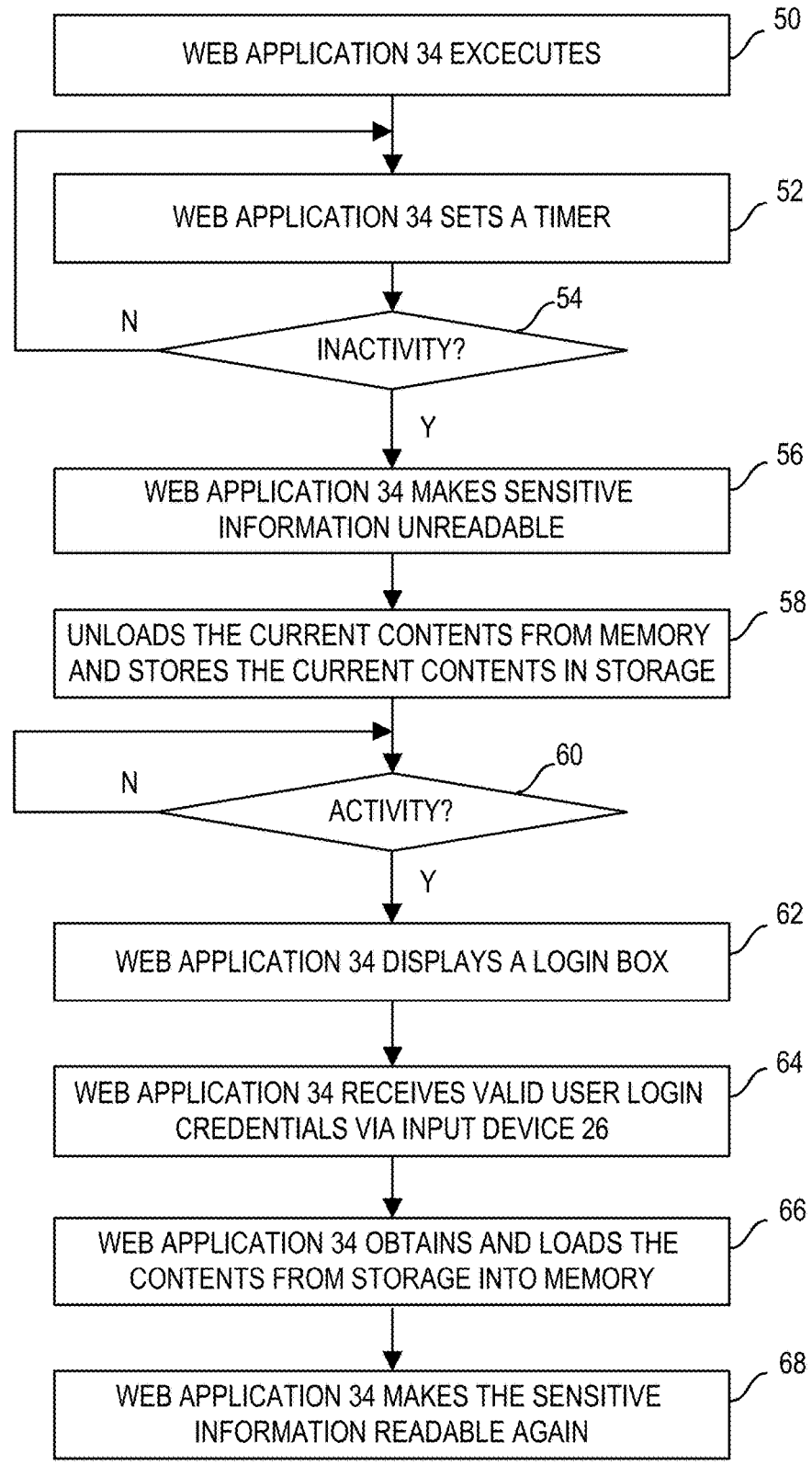
FIG. 2 is a flow diagram of an example web session security method.

Network 40 may include one which uses the transmission control protocol/internet protocol (TCP/IP). Network 40 may include a combination of local area and wide area networks. Network 40 may include any combination of wireless or wired networks. Network 40 may include a combination of private and public networks, including a global communication network, also known as the Internet. Network may include any combination of wireless technologies, including Wi-Fi, Bluetooth and/or near field communication (NFC) standard circuitry Referring now to FIG. 2, an example web session security method is illustrated.

In step 50, web application 34 executes and displays a form within a window. The window may be associated with web browser software 22. As part of the form, web application 34 displays sensitive information, which may include information entered by the user.

In step 52, web application 34 sets a timer following each user action.

In step 54, web application 34 determines whether the time period since the last user action exceeds a predetermined threshold time period. In one example embodiment, web application 34 determines the time period since the last message from input device 26.

If the time period since the last user action exceeds a predetermined threshold time period, operation continues to step 56. Otherwise, operation returns to step 54 to continue waiting.

In step 56, web application 34 makes displayed sensitive information unreadable.

For example, web application 34 may use Microsoft Silverlight brand browser plugin software to capture an image of the contents of the window associated with web application 34, alter the image to make the sensitive information unreadable (FIG. 3), and display the altered image over the window contents. Web application 34 may use a blurring function available in the Silverlight plugin to create the altered image. Web application 34 may also use the Silverlight plugin to obtain screen coordinates associated with the window contents and accurately display the altered image at the same coordinates. A user cannot see any information that might be displayed under the altered image.

In the example embodiment, the Silverlight plugin blurring function may be configured such that the altered image has similarities with the unaltered image so that a user can recognize what the user was working on, even though the user cannot read any of the sensitive information.

In step 58, unloads the current contents from memory and stores the current contents in storage.

In step 60, web application 34 waits for the user to resume use. If no activity has occurred, operation returns to step 60 to continue waiting. If web application 34 determines that activity has occurred, operation proceeds to step 62.

Figure 3:
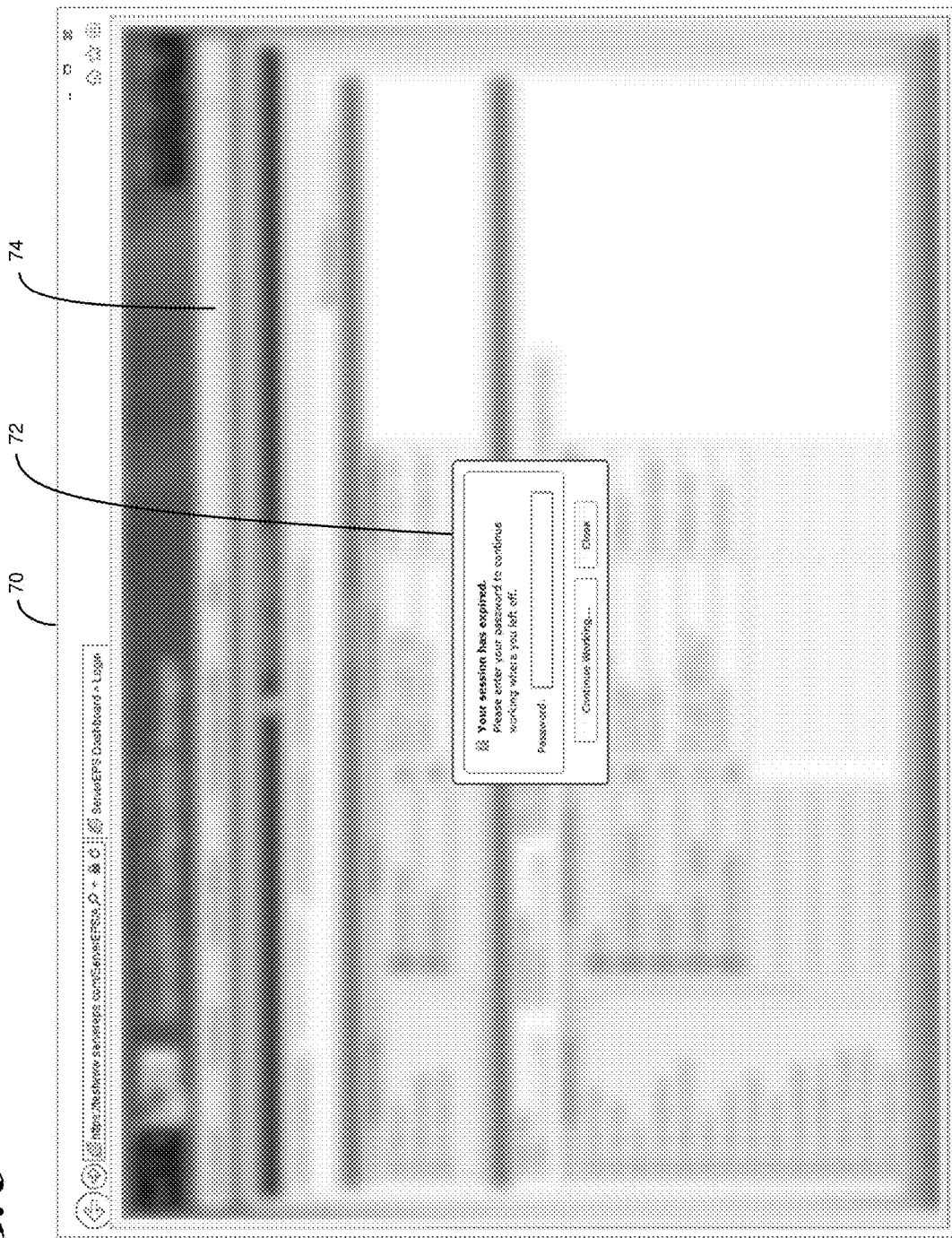
FIG. 3 is an image of an example displayed screen following a period of inactivity.

In step 62, web application 34 displays a login box (FIG. 3).

In step 64, web application 34 receives valid user login credentials via input device 26.

In step 66, web application 34 obtains and returns the contents to memory.

Figure 4:
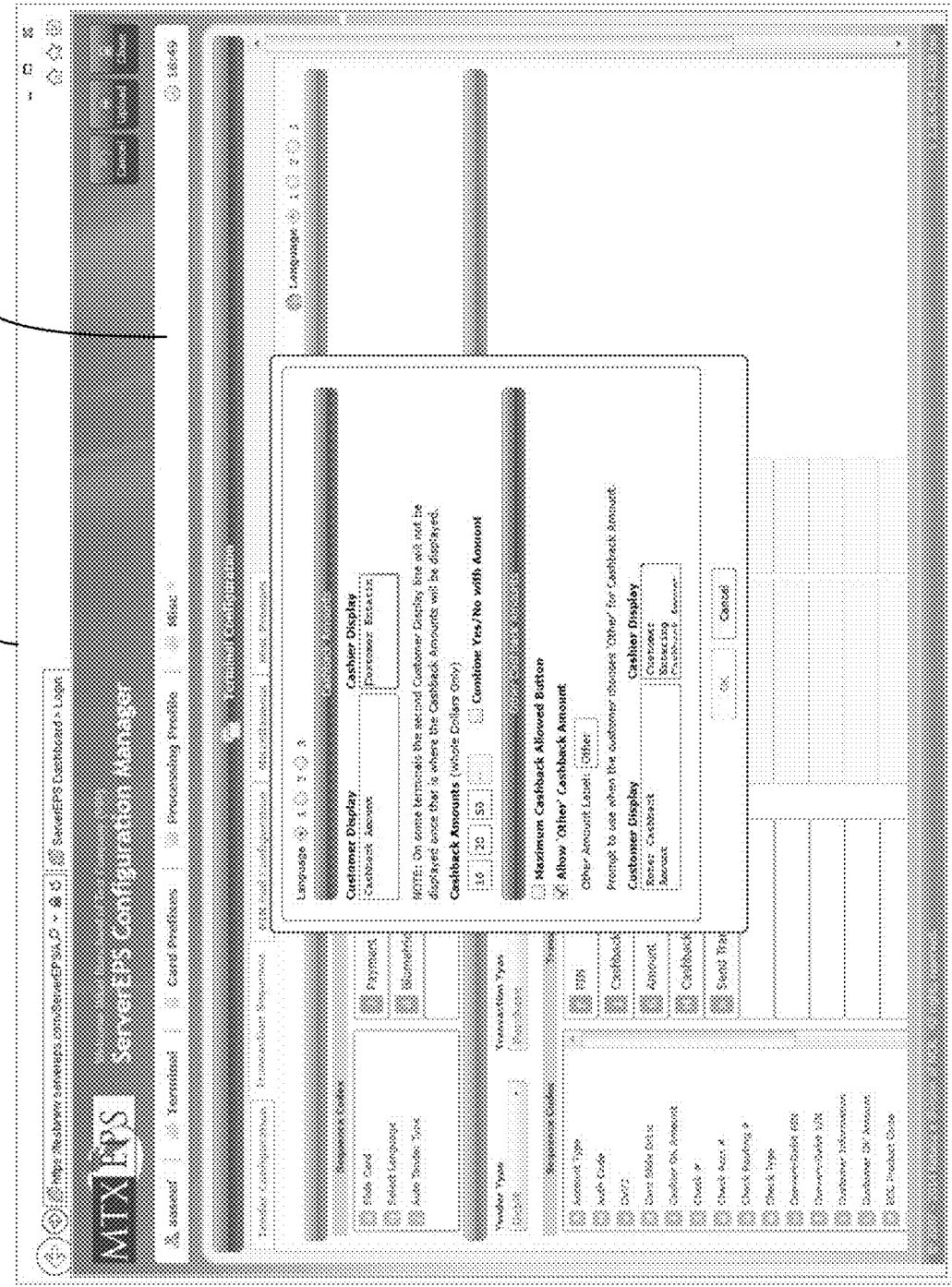
FIG. 4 is an image of the example displayed screen during use.

In step 68, web application 34 makes the sensitive information readable again by ceasing display of the altered image (FIG. 4).

If the user allows another period of inactivity to exceed the predetermined time period, web application 34 will capture a new image of the current window contents.

Advantageously, web application 34 allows a user to resume use following a period of inactivity, rather than logging the user off and requiring the user to start over.

Referring now to FIG. 3, a first screen image of web application 34 illustrates one method of making displayed sensitive information unreadable. In this example, web application 34 blurs all content 74 within window 70.

Also in this example, the frame, menus, address, and controls associated with window 70 remain readable. Operating system features and other open windows are unaffected.

In another example embodiment, web application 34 may make the entire display area of display 24 unreadable.

Also illustrated is an example login box 72, which web application 34 displays after sensing user activity. A user may login to resume working from where the user left off.

Referring now to FIG. 4, a second screen image of web application 34 illustrates what content 74 looks like after a user has resumed use of web application 34.

Although the invention has been described with particular reference to certain preferred embodiments thereof, variations and modifications of the present invention can be effected within the spirit and scope of the following claims.

What is claimed is:

1. A web session security method comprising:
   setting, by a processor, a timer following a last user entry in a displayed form during use of a web application;
   determining, by the processor, that a time period since the last user entry exceeds an application time period;
   making, by the processor, the displayed form unreadable;
   determining, by the processor, that user activity has occurred;
   displaying, by the processor, a login box in connection with the web application;
   receiving, by the processor, valid user login credentials; and
   making, by the processor, the displayed form readable.

2. The method of claim 1, further comprising:
   unloading, by the processor, the sensitive information from memory when making the displayed form unreadable; and
   temporarily storing, by the processor, the sensitive information in storage.

3. The method of claim 2, further comprising:
   obtaining, by the processor, the sensitive information from the storage; and
   loading, by the processor, the sensitive information from the storage into memory prior to making the displayed form readable.

4. The method of claim 1, wherein making the displayed form unreadable comprises: blurring the displayed form.

5. The method of claim 1, wherein making the displayed form unreadable comprises:
   capturing, by the processor, a first image of the form;
   altering the first image to create a second image in which the sensitive information is unreadable; and
   displaying the second image over the form.

6. The method of claim 5, wherein altering comprises: blurring the first image.

7. The method of claim 4, wherein blurring comprises: making the displayed sensitive information in the form unreadable but recognizable as present.

8. The method of claim 4, wherein blurring comprises:
   obtaining screen coordinates associated with the form; and
   displaying the second image at the screen coordinates.

9. A web session security method comprising:
   setting, by a processor, a timer following a last user entry in a displayed form during use of a web application;
   determining, by the processor, that a time period since the last user entry exceeds an application time period;
   making, by the processor, the displayed form unreadable;
   unloading, by the processor, the sensitive information from memory;
   temporarily storing, by the processor, the sensitive information in storage;
   determining, by the processor, that user activity has occurred;
   displaying, by the processor, a login box in connection with the web application;
   receiving, by the processor, valid user login credentials;
   loading, by the processor, the sensitive information from the storage into memory; and
   making, by the processor, the displayed form readable.

10. The method of claim 9, wherein making the displayed form unreadable comprises:
    capturing, by the processor, a first image of the form;
    blurring the first image to create a second image in which the sensitive information is unreadable; and
    displaying the second image over the form.

11. The method of claim 10, wherein making the displayed form unreadable further comprises:
    obtaining screen coordinates associated with the form; and
    displaying the second image at the screen coordinates.

12. A computer comprising:
    an input device;
    a display; and
    a processor configured to:
      display a form generated by a web application on the display;
      enter sensitive user information from the input device into the form;
      set a timer following a last user entry in the displayed form;
      determine that a time period since the last user entry exceeds an application time period;
      make the displayed form unreadable on the display;
      determine that user activity has occurred;
      display a login box in connection with the web application on the display;
      receive valid user login credentials from the input device; and make the displayed form readable on the display.

13. The computer of claim 12, wherein the processor makes the displayed form unreadable by blurring the displayed form.

* * * * *